Jan. 5, 1965  J. S. McCLIMON  3,164,218
PORTABLE FIELD SCALE
Filed June 23, 1961  2 Sheets-Sheet 1

*INVENTOR.*
JAY S. McCLIMON
BY
Oberlin, Maky & Donnelly
ATTORNEYS

Jan. 5, 1965  J. S. McCLIMON  3,164,218
PORTABLE FIELD SCALE

Filed June 23, 1961  2 Sheets-Sheet 2

INVENTOR.
JAY S. McCLIMON
BY
Oberlin, Maky & Donnelly
ATTORNEYS

United States Patent Office 3,164,218
Patented Jan. 5, 1965

3,164,218
PORTABLE FIELD SCALE
Jay S. McClimon, 1118 Castleton Road, Cleveland, Ohio
Filed June 23, 1961, Ser. No. 119,095
8 Claims. (Cl. 177—134)

This invention relates generally, as indicated, to a portable field scale and more particularly to a portable field scale for weighing large rubber tired vehicles such as earth moving off-the-road machinery.

Large rubber tired off-the-road machinery is used extensively in areas such as quarries, open pit mines, highway construction and excavations, and, whether such equipment is of the tractor-trailer type or of the dump truck type, it prevents a problem to weigh the loads carried thereby.

Presently, adequate scales to weigh the larger of these vehicles have not been provided. Due to the extreme weights involved and the difficult field conditions under which such vehicles must be weighed, complete fracture of both the lower base and upper weighing platform in such devices has been not uncommon. Since the upper platform area of such scales must be adequate for weighing vehicles equipped with large trees and since the scales must generally be positioned so that the vehicle can be driven thereon, it can readily be understood that the platform and the base supporting the scale will be subject to shocks and loads considerably in excess of the actual loaded weight of the vehicle on a particular tire. Also, heretofore, it has been necessary carefully to center the vehicle tires on the platform scale and in so doing much of the advantages of high-speed weighing which is necessary in most production jobs is lost.

Accordingly, the platform must be large enough to accommodate tires even as large as 33.5 x 33 and yet be sufficiently strong to support, for example, axle loading up to 126,000 pounds. It can then readily be seen that it is a formidable task to provide a scale having a platform of sufficient size which will have a platform and base of sufficient strength and rigidity to weigh extremely large loaded vehicles with scales designed for single tire readings.

It is therefore a principal object of the present invention to provide a rugged high capacity portable weighing scale for off-the-road earth moving machinery and the like.

It is another main object of the present invention to provide a rugged high capacity portable weighing scale which can easily be positioned quickly and conveniently to weigh vehicle loads.

It is another object to provide a rigid durable high-capacity weighing scale for off-the-road machinery and the like which can quickly and conveniently be positioned and which will obtain the weight of the vehicle on a rubber tire with a single reading.

It is yet another object of the present invention to provide a weighing scale for rubber-tired off-the-road machinery which will have a capacity of at least 100,000 pounds.

It is a still further object of the present invention to provide such a weighing scale which can simply and easily be fabricated.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
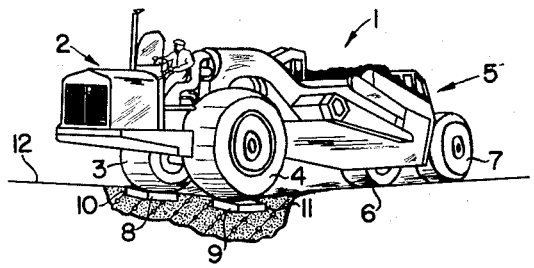
FIG. 1 is a perspective view partially in section of portable scales in accordance with the present invention in operation.

Referring now more particularly to FIG. 1, there is illustrated a typical off-the-road vehicle of the rubber tired type which the scale of the present invention is particularly adapted for weighing. Such vehicle 1 is of the tractor-trailer type wherein the tractor 2 is mounted on large rubber tires 3 and 4 and the trailer 5 is also mounted on tires 6 and 7. The trailer 5 is, of course, pivotally connected to the tractor and includes means for picking up and discharging a load of earth, gravel, shale, coal, ore or other like material.

In order to weigh the vehicle and, of course, the load carried thereby, there are provided two portable scales 8 and 9 in accordance with the present invention which may be placed in shallow weighing pits 10 and 11 and spaced apart a distance equal to the distance between the tires 3 and 4. Although it will be understood that ramps or the like may be provided to drive the vehicle on top of the scales, it is preferable that weighing pits be employed and that the top surface of the weighing platform thereof be substantially coincident with the grade 12 over which the vehicle travels. If the vehicle is required to drive up a ramp to the weighing platform, the ramps must be of substantial construction and the resultant bump or jar caused by the vehicle moving from the ram to the platform considerably increases the load and the possibility of fracture of scale parts. Accordingly, it can readily be seen that a weighing scale embedded in a weighing pit with the weighing platform thereof substantially flush with the grade is much preferred. In view of this, it is also preferred that the weighing scales have as low profile as possible to avoid excessive digging in the proper footing of the weighing scale within the weighing pit.

The weighing scales 8 and 9 will be substantially identical in form, each provided with a load cell from which a reading may be obtained and the simple addition of the two readings will provide the front axle weight of the vehicle. The vehicle may then be driven forwardly to place the rear wheels 6 and 7 on the scales and the rear axle weight of the vehicle may be similarly obtained. Since the tare weight of the vehicle will be known, it can be subtracted from the total weight obtained to compute the weight of the load.

Referring now to FIGS. 2, 3, 4 and 5, the weighing scale 9, for example, may comprise a weighing platform 15 and a scale base 16. The scale base 16 may preferably be made of an aluminum alloy which comprises a bottom plate 17 and an upstanding peripheral inwardly directed F-section shape wall portion 18 having a top inwardly directed flange 19 and an intermediate horizontally inwardly directed shelf 20 which is additionally horizontally supported above the plate 17 by a series of vertically extending webs 21. The plate 17 extends beyond the upstanding wall 18 to form in effect a peripherally horizontally extending flange or foot 22 which extends entirely around the base 16. The upstanding wall portion 18 with the top inwardly directed flange 19 cooperates with the plate 17 to form a rectangular box type structure having an open top as indicated by the opening 23 (note FIG. 2). The upstanding wall portion 18 may then be said to include two longitudinally extending or side walls 24 and 25 and two end walls 26 and 27. The intermediate inwardly directed shelf 20 along the interior of the side walls 24 and 25 forms level and parallel support surfaces 30 and 31 for elongated knife edge fulcrums 32 and 33.

These faces for the knife edge fulcrums 32 and 33 are checked to ensure that they are level and parallel before a network of stiffening channels is welded to the top surface of the base. Such stiffening channels include two longitudinally extending stiffening channels 35 and 36 and two transversely extending channels 37 and 38. The transversely extending channels 37 and 38 may slope downwardly as shown at 39 and 40 in FIG. 2 so that the outer or distal ends of such channels will be flush with the fulcrum supporting surfaces 30 and 31. The longitudinally and transversely extending channels may be welded directly to the base 17 and will form a rectangular channel box reinforcement about a load cell base 43 positioned substantially in the center of the base and thus the center of the scales with such base being fastened to the plate 17 by suitable fastenings as, for example, cap screws shown at 44.

Figure 2:
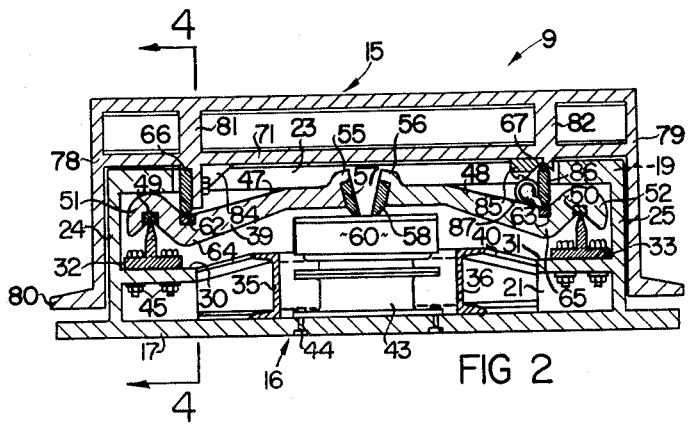
FIG. 2 is a transverse section of one of such portable scales taken substantially on the line 2—2 of FIG. 3.

The knife fulcrums 32 and 33 may have a sectional configuration shown more clearly in FIG. 2 and such are fastened through suitable fasteners to the shelf surfaces 30 and 31 by suitable fasteners as the nut and bolt assemblies shown at 45. Such nut and bolt assemblies 45 pass through the face flanges of the knife fulcrums 32 and 33 and the upstanding center portion of the knives provides a top flat edge which may be from $1/16$ to $1/32$ of an inch wide. Such knife edges may, in the illustrated embodiment, be 2′5¾″ long and such edges support the outer ends of scale beams 47 and 48. The knife edges are preferably case hardened steel and engage case hardened steel inserts 49 and 50 respectively in the crotch or bight portion of the outer downwardly curved ends of such beams as shown at 51 and 52. The inserts 49 and 50, like the ends 51 and 52 of the scale beams, may preferably be the same length as the scale beam supporting knife edges, such edges extending substantially the width of the scale base 16. The opposite or inner ends of the scale beams 47 and 48 are considerably narrower than the outer ends and such inner ends include upstanding portions 55 and 56 which have longitudinally extending recesses adapted to receive case hardened steel knives 57 and 58 which rest on top of load cell 60 which is in turn mounted on the load cell base 43. Such load cell may, for example, be a Martin Decker E–92 S.W. series compression load cell with a 12″ dial calibrated to read to 100,000 pounds. The knife edges 57 and 58 may be fastened to the inner ends of the scale beams 47 and 48 by means of screws or the like 61. Such knife edges, like the inserts 49 and 50, as well as the knife edge supports 32 and 33, may be case hardened steel as for example 60–80C steel and the inserts 49 and 50 must, of course, be a tight fit within the aluminum scale beams 47 and 48 and such inserts are preferably cemented in place.

Similar inserts 62 and 63 spaced slightly inwardly of the outer inserts and directed upwardly in the crotch or bight portion of intermediate downwardly curved portions 64 and 65 of the scale beams serve to support the scale platform 15 through parallel knives 66 and 67.

The scale platform comprises a top deck 70 providing a top surface for the vehicle wheels, such top deck being vertically supported above an intermediate deck or plate 71 with a series of I-beams 72, 73, 74 and 75 extending between such top deck 70 and the plate 71. The center I-beams 73 and 74 may preferably be spaced the furthest apart, as for example, 8¼ inches with the beams 72 and 75 being equally spaced therefrom but closer to the downwardly extending end walls 76 and 77 than to the beams 73 and 74. The platform then includes downwardly extending end walls 76 and 77 and similar side walls 78 and 79 which terminate in a bottom flange 80 which is slightly spaced from the outwardly extending peripheral portion 22 of the face plate 17. It can now be seen that the platform walls 76 through 79 form with the platform plate 70 a downwardly extending box-like structure which telescopes over the upstanding walls 24 through 27 of the base 16.

Figure 3:
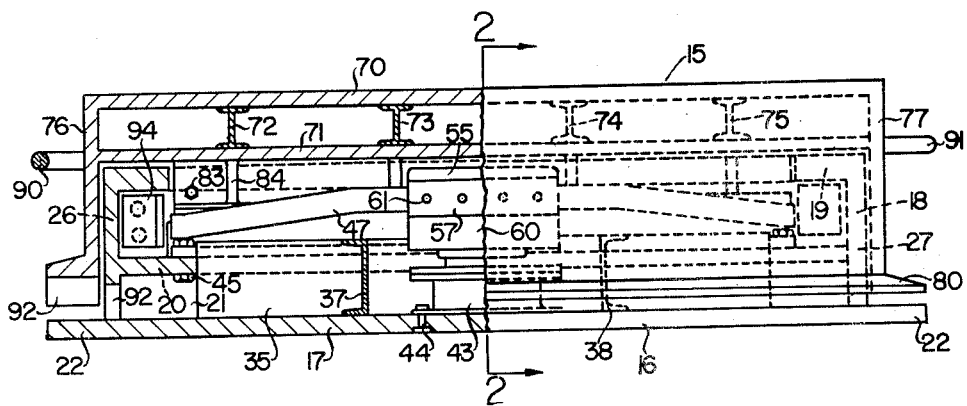
FIG. 3 is a side elevation of such scale partially broken away and in section.
Figure 4:
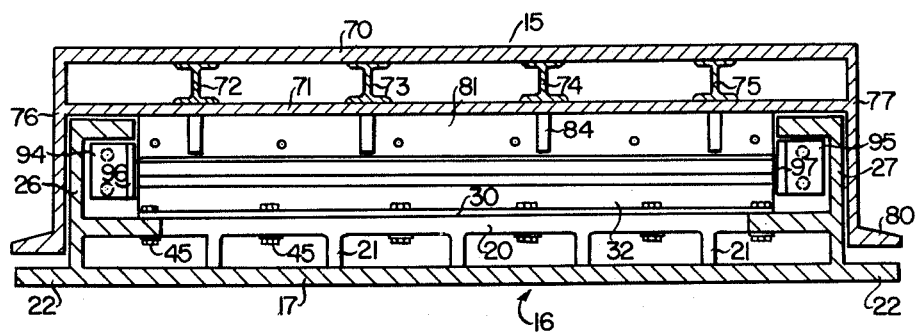
FIG. 4 is a longitudinal section of such scale taken substantially on the line 4—4 of FIG. 2 with elements thereof removed for clarity of illustration.
Figure 5:
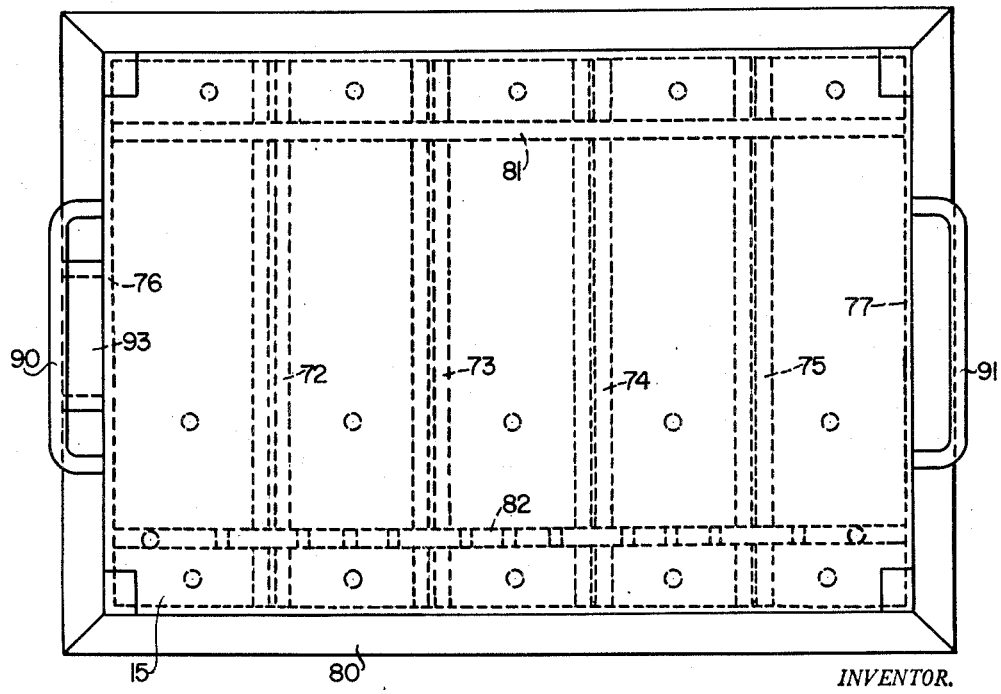
FIG. 5 is a top plan view of such weighing scale.

Integrally formed with the plates 70 and 71 are two longitudinally extending vertical webs 81 and 82 which divide the I-beams 72 through 75 into three segments with the center segment being the longest as shown in FIG. 2. Such I-beams may be plug welded to the plates to provide the requisite stiffness for the top platform plate 70. The vertically extending web 81 extends downwardly of the plate 71 and is provided with a longitudinally extending recess so that the knife blade 66 may be fastened therein as by screws 83. Stiffening webs or gusset plates 84 may be secured to the downward extension of the member 81 and the lower plate 71 to rigidify the same. Four such webs are provided, as shown in FIGS. 3 and 4, and the spacing of such may correspond to that of the I-beams 72 through 75. Secured to the underside of plate 71 beneath the longitudinally extending web 82, there is provided a longitudinally extending knife edge receptacle block 85 which may be fastened to the bottom of plate 71 by screws and such block is provided with a longitudinally extending V-groove adapted to receive knife blade 86 which may be held to the steel beam 48 by a pair of steel springs of the configuration shown in FIG. 2.

In the assembled scale, it can then be seen that the parallel knives 66 and 67 support the platform 15 on the scale beams 47 and 48 inwardly of the outer support of the beams on the fulcrums 32 and 33, with the edges of such knives 66 and 67 engaging the hardened steel inserts 62 and 63 in the top surface of such scale beams. The knives 66 and 67 as well as the knife receiving block 85 may, like the inserts and knives 32, 33 and 57, be of hardened steel material. The platform itself, however, will be fabricated preferably of aluminum alloy as, for example, 6061-T6. The positioning of the inserts and thus the contact points for the platform and base on the scale beams 47 and 48 may provide a scale ratio of about 6.58 to 1 for the illustrated embodiment.

The platform 15 is provided with handles 90 and 91 whereby the platform 15 can readily be removed from the scale base so that the scale can be readily carried in two separate pieces. An access opening 92 may be provided in the end wall 26 of the scale base and a curved recess 93 may be provided in the flange 80 on the end wall 76 of the platform 15, both the recess and access opening providing access to the load cell 60. Since the scale beams 47 and 48 will be loosely mounted in the base, keepers 94 and 95 may be provided at the opposite ends of each scale beam secured to the inside of the upstanding side walls 24 and 25 of the base. Such keepers may preferably be aluminum alloy angles providing keeper plates 96 and 97 which maintain the scale beams 47 and 48 properly centered on the supporting knife edges.

It will, of course, be understood that the load cell 60 may be either electric or hydraulic, but in any event, very small movement of the platform 50 with respect to the base will be sufficient to obtain the load thereon. It is noted that the positive stop between the platform at the base is provided by the peripheral flange 19 which will uniformly contact the intermediate or bottom plate 71 of the cover or platform 15.

It can now be seen that there has been provided a portable yet extremely rugged weighing scale which can quickly and accurately with a single reading measure the weight thereon. Moreover, the ruggedness of the platform and base will enable such to withstand the shocks, jars and bouncing loads as that obtained when the size wheels such as shown at 3 and 4 in FIG. 1 bounce up and down thereon. The peripheral rigidifying wall portions of both the platform and base are additionally reinforced by a latticework of rigidifying channels or beams to preclude platform or base fracture under such loads.

Other modes of applying the principles of the invention may be employed, change being made as regards the details described, provided the features stated in any of the following claims or the equivalent of such be employed.

I, therefore, particularly point out and distinctly claim as my invention:

1. A portable weighing scale comprising an open top box-like base having upstanding walls, a load cell mounted centrally in said base, stiffening means surrounding said load cell, inwardly directed shelves in said base extending from said walls, scale beams extending between said shelves and load cell, and a weighing platform supported on said beams comprising a double-plate platform structure with stiffening means therebetween, and a peripheral skirt adapted to telescope over the walls of said box-like base.

2. A scale as set forth in claim 1 including hardened steel knives positioned between said platform and beams, said beams including hardened steel inserts adapted to receive said knives.

3. A scale as set forth in claim 2 including hardened steel knife supports mounted on said shelves and engaging hardened steel inserts in said beams.

4. A scale as set forth in claim 1 wherein said load cell is mounted in the center of said base and said shelves extend along the sides of said base, said beams being of considerable width adjacent said shelves but relatively narrow at said load cell.

5. A portable weighing scale comprising an open top box-like base having upstanding walls, a platform mounted thereon and having a peripheral skirt adapted to telescope over said walls, said walls having an inwardly directed top peripheral flange adapted to provide a positive stop for said platform, means to stiffen and rigidify both said base and platform, means supporting said platform within said base operative to measure the load thereon, horizontal shelves in said base extending inwardly from said walls, a load cell in said base, said base and platform being made of aluminum, and cast aluminum scale beams extending between said shelves and the load cell, said platform being supported thereon.

6. A scale as set forth in claim 5 wherein said load cell is mounted in the center of said base and said shelves extend along the sides of said base, said beams being substantially the width of said base adjacent said shelves but relatively narrow at said load cell.

7. A scale as set forth in claim 6 including hardened steel knives fastened to said beams adapted to support the narrow ends of said beams on said load cell.

8. A portable weighing scale comprising an open top box-like base having upstanding walls, a platform mounted thereon and having a peripheral skirt adapted to telescope over said walls, said platform including two plates spaced one above the other, and I-beams interposed therebetween, said walls having an inwardly directed top peripheral flange adapted to provide a positive stop for said platform, means to stiffen and rigidify both said base and platform, said stiffening and rigidifying means being operative substantially to eliminate distortion of said base, and means supporting said platform within said base operative to measure the load thereon.

References Cited in the file of this patent

UNITED STATES PATENTS

| | | |
|---|---|---|
| 777,012 | Fairbanks | Dec. 6, 1904 |
| 941,208 | Sturgis | Nov. 23, 1909 |
| 1,030,099 | Llobet | June 18, 1912 |
| 1,168,496 | Grundman | Jan. 18, 1916 |
| 2,812,221 | Cupler | Nov. 5, 1957 |

FOREIGN PATENTS

| | | |
|---|---|---|
| 1,471 | France | 1823 |
| 270,674 | Great Britain | 1926 |
| 921,978 | France | Feb. 11, 1946 |
| 942,273 | France | Sept. 13, 1948 |